United States Patent [19]

Ekstrand

[11] 4,193,493

[45] Mar. 18, 1980

[54] ROLLER CONVEYOR

[75] Inventor: Kjell G. Ekstrand, Ystad, Sweden

[73] Assignee: Transportteknik Gunnar Ekstrand AB, Sweden

[21] Appl. No.: 843,258

[22] Filed: Oct. 18, 1977

[30] Foreign Application Priority Data

Oct. 19, 1976 [SE] Sweden ............................... 7611577

[51] Int. Cl.[2] ............................................. B65G 13/06

[52] U.S. Cl. ...................................... 198/781; 308/20; 308/72

[58] Field of Search ............... 198/780, 781, 783, 789, 198/790, 842, 843; 308/20, 72

[56] References Cited

U.S. PATENT DOCUMENTS

| | | | |
|---|---|---|---|
| 2,602,536 | 7/1952 | Eggleston | 198/789 |
| 2,860,766 | 11/1958 | Welter | 198/780 |
| 2,973,093 | 2/1961 | Erickson | 198/789 |
| 3,063,761 | 11/1962 | Hoddy et al. | 308/72 |
| 3,161,125 | 12/1964 | Hornbostel | 198/780 |
| 3,181,688 | 5/1965 | Schermer | 198/789 |
| 4,006,815 | 2/1977 | Werntz | 198/781 |

FOREIGN PATENT DOCUMENTS

| | | | |
|---|---|---|---|
| 1175600 | 8/1964 | Fed. Rep. of Germany | 308/20 |
| 2557567 | 4/1977 | Fed. Rep. of Germany | 198/780 |

*Primary Examiner*—Robert B. Reeves
*Assistant Examiner*—Douglas D. Watts
*Attorney, Agent, or Firm*—B. P. Fishburne, Jr.

[57] ABSTRACT

The disclosure relates to a roller intended for a roller conveyor, the roller being mounted by means of bearing pieces on a through-shaft which is journalled by means of ball bearings in a frame. Of the bearing surface of the bearing pieces and the roller ends abutting against this surface, at least one is planar and the other arched, so that the roller, on being influenced by heavy loads, may be bent downward somewhat. The bearing pieces and the surface of the roller ends abutting against them are made of compatible materials, such as plastic and steel. The bearing pieces are fixedly locked to the shaft and each have a radial abutment for restricting the axial movement of the roller. One bearing piece may be provided with a driving wheel which engages with a driving member such as a chain.

4 Claims, 1 Drawing Figure

23
22
24
21
20
19
10
11
17
18
16
19
15
14
13
12

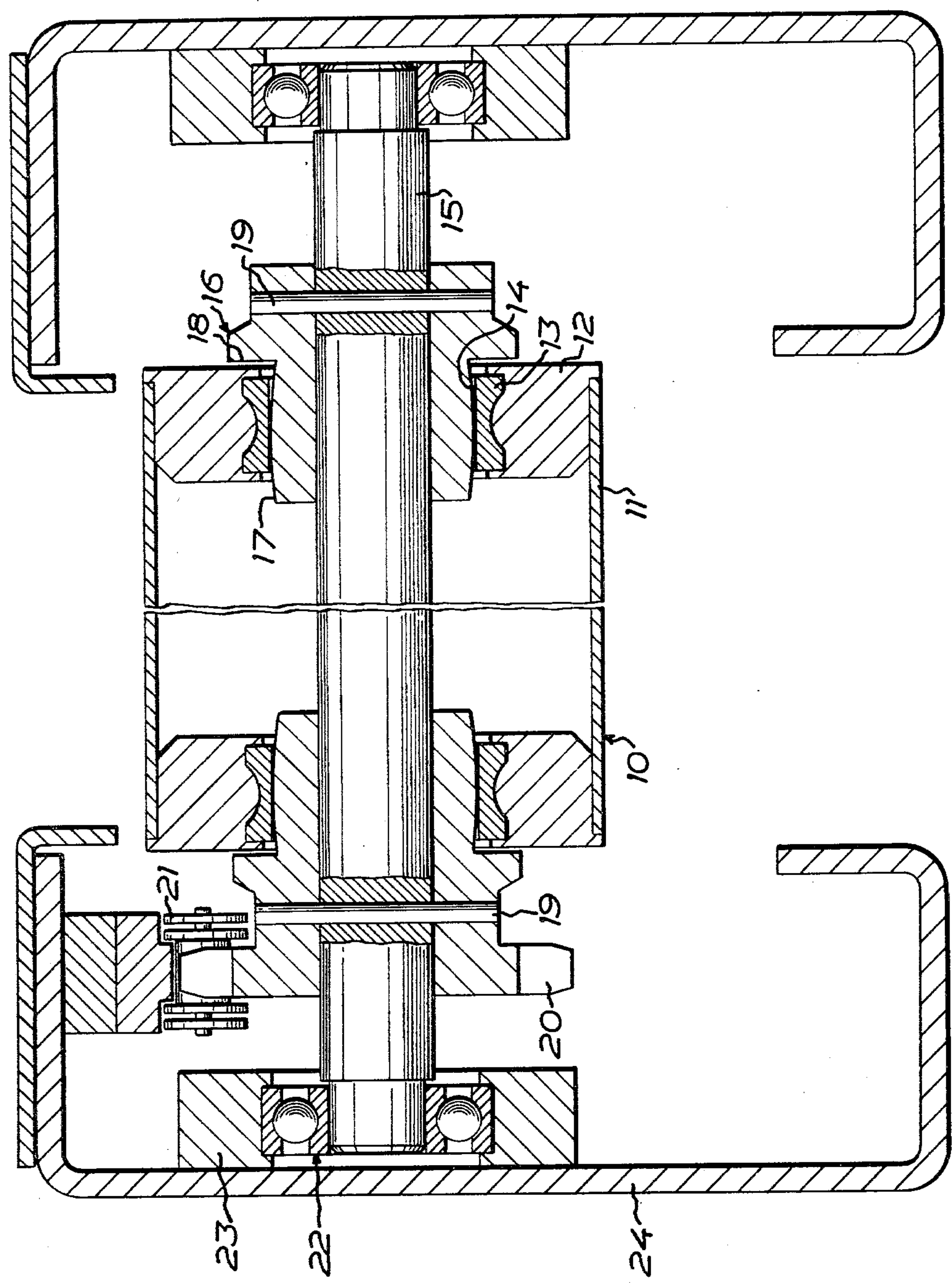
15
19
16
18
14
13
12
11
17
10
21
19
20
23
22
24

ROLLER CONVEYOR

The present invention relates to a roller conveyor with rollers which are each mounted by means of bearing pieces, on a through-shaft journalled in the frame of the conveyor.

Roller conveyors of the above type are used to a great extent industrially for the transport of goods. Irrespective of whether the rollers of the roller conveyor are driven or not, the bearings of the shaft and rollers are exposed to very great stresses, the roller bearings being particularly greatly exposed because of the great flexural stresses caused by the goods. Stresses on the bearings entail that these must often be replaced, with resulting considerable costs. A particular problem in this context is so-called accumulating roller conveyors, that is to say conveyors where goods are transported and stopped while retaining driving power on the rollers, in order, for example, to be rerouted to another conveyor or receptacle point. Rollers for such conveyors have hitherto been designed with smooth friction bearings of the radial or axial type. Inclination in the bearing because of flexural stress on the roller has, here, a destructive abrasive effect on the bearing surfaces. Breakdown in the bearing system normally means that the entire roller must be replaced.

It is previously known from DT-AS No. 1,065,773 to provide flexible undriven rollers of rubber, for example, for supporting elastically yieldable belts when the downward bending of the roller is of importance for the function of the apparatus. In such cases, the roller must be easily shiftable on its supports in order that this downward bending be able to take place and the supporting pieces must be journalled on stub shafts with bulbous ends. A device for foodstuff transport is known from U.S. Pat. No. 3,931,878 which also has stub shafts with bulbous ends, but in this case in order to make possible easy dismantling for purposes of cleaning the apparatus. Stub shafts of this type are unusable for obviating the above-mentioned problem, since wear on bearings and the risk for breakdown is even greater in the last-mentioned type.

The object of this invention is to greatly improve the journalling of rollers in roller conveyors to the extent that stresses and, thereby, wear on the bearing is considerably reduced, even to such a degree that horizontally driven accumulating roller conveyors may economically be used instead of undriven sloping conveyors, for example in so-called transition depots.

According to the invention, at least either one of the bearing surface of the bearing pieces and the surface of the roller ends abutting against this surface is arched in the axial direction. Moreover, these surfaces are produced from materials which are mutually compatible as regards friction. Preferably, one of the bearing surfaces is arched and the other is planar, and the materials consist of plastic and steel.

The present invention will be described in greater detail hereinbelow with reference to the accompanying drawing which illustrates in axial section one embodiment of the invention.

On the drawing, there is shown a roller 10 which consists of a sheet metal casing 11, end pieces 12 being fixed in a suitable manner in the ends of the casing. The end pieces 12 have a central opening along the periphery of which is fixed an annular bearing means 13 of steel. The bearing means 13 has a planar inner surface 14. The roller 10 is supported by a shaft 15 with the assistance of sheath-shaped bearing pieces 16 which are passed on the shaft 15. The bearing pieces 16 project with a portion into the central opening of the end pieces 12, this portion having an arched bearing surface 17 which with substantially linear contact abuts against the planar bearing surface 14 of the annular bearing means 13. The portion of the bearing pieces 16 provided with the axially arched bearing surface 17 is defined by an abutment 18 which counteracts axial movement of the roller 10 relative to the bearing pieces 16 and the shaft 15, respectively. The bearing pieces 16 are connected to the shaft 15 each by means of a locking pin 19 which extends diametrically through the bearing piece and the shaft. As is shown to the left of the drawing, a sprocket wheel 20 can be provided integrally with the bearing piece 16, the sprocket wheel 20 engaging with a drive chain 21 for rotation of the shaft 15 and the roller 10 by means of the friction which occurs between the bearing pieces 16 and the annular bearing means. The sprocket wheel can also be of, for example, steel and be fixed to the bearing piece 16.

The ends of the shaft 15 are journalled in a frame 24 by means of ball bearings 22 which are fixed in cages 23 which are fixedly screwed to opposing surfaces on the frame 24.

With a roller 10 which is mounted on the shaft 15 in the above-described manner, the stresses on the bearings of the roller on flexural stresses of the shaft are to a great extent reduced thanks to the arching of the bearing surface 17 of the bearing pieces 16 and because of the fact that the mutually abutting bearing surfaces are of different material, namely steel and plastic.

A considerable advantage in the invention is, moreover, that the bearings of the roller 10 and the shaft 15 may be replaced easily and rapidly. On replacement of the bearing pieces 16, the locking pin 19 is quite simply tapped out, the old bearing piece 16 is removed by withdrawal or dismemberment and a new bearing piece 16 is mounted and locked in place. On replacement of the ball bearings 22, the cages 23 are first unscrewed and a new cage 23 is screwed in place.

The important arched surface 17 need not, naturally, be disposed on the bearing pieces 16 but may just as well be disposed on the annular bearing means 13. Naturally, it is possible that both the bearing surface 17 and the bearing surface 14 be arched in the axial direction. Similarly, the bearing pieces 16 may naturally be produced in steel and the bearing means 13 in plastic. Other materials can also be used for this purpose, the major requirement being that they be compatible as regards friction.

By means of the above-described apparatus, roller conveyors can be produced which have considerably improved bearing working life and whose bearings may easily be replaced if necessary. The construction parts which are utilized are, moreover, of cheap material, for which reason a roller conveyor manufactured according to the invention displays considerable advantages also as regards economy. A particular advantage inherent in the apparatus according to the present invention is that by applying the inventive conception it is possible to manufacture driven accumulating roller conveyors without any risk of rapid wear of the bearings. The reason for this is that when the rollers 10 are stationary, the slippage between the bearing surfaces 14 and 17 occurs only at the point of linear contact and it will be apparent that because of the arched surfaces, no increase of the flexural stresses will occur when the roller is bent because of heavy loading.

It is apparent from the above description that the invention may be modified within broad limits, for which reason it should not be considered as restricted to that described above and shown on the drawing.

I claim:

1. In a roller conveyor, a pair of side frame members, roller shaft bearings on said side frame members, substantially rigid roller shafts journaled on said bearings, solid comparatively thick and rigid bearing pieces fixed on each roller shaft in axially spaced relationship, a relatively less rigid conveyor roller for each roller shaft and having end bearing elements which are axially thick and rigid and engaged supportively with said bearing pieces each end bearing element having an outer end face defining one end face of said conveyor roller and extending axially inwardly thereof to a point near the inner end of one bearing piece, each end bearing element including a bearing insert having a cylindrical bore, the engaging surface of each bearing piece being axially elongated and extending therefor said cylindrical bore of the bearing insert and being gently arched axially of the conveyor roller and said bore, and said insert and at least the arched engaging surface portion of each bearing piece being formed of specifically different compatible low friction materials.

2. In a roller conveyor as defined in claim 1, and said bearing insert being formed of metal and said arched engaging surface portion being formed of plastics material.

3. In a roller conveyor as defined in claim 1, and said bearing pieces each having a radial shoulder disposed axially outwardly of one of said end bearing elements to limit end play in each conveyor roller.

4. In a roller conveyor as defined in claim 3, and a driving rotational element fixed on one of said bearing pieces, and driving means engaging said driving element.

* * * * *